NOISE CLAMPING CIRCUIT FOR F.S.K. RECEIVER

Filed April 24, 1967

INVENTOR:
ROBERT P. DIXON,
BY I. David Blumenfeld
HIS ATTORNEY.

United States Patent Office 3,497,812

Patented Feb. 24, 1970

3,497,812

NOISE CLAMPING CIRCUIT FOR F.S.K. RECEIVER

Robert P. Dixon, Rustburg, Va., assignor to General Electric Company, a corporation of New York Filed Apr. 24, 1967, Ser. No. 633,204

Int. Cl. H04b *1/16*

U.S. Cl. 325—320 4 Claims

ABSTRACT OF THE DISCLOSURE

The output of a frequency-shift-keyed data receiver is clamped in the absence of a carrier signal to prevent the generation of false data signals due to noise. A level detector circuit is coupled to one of the stages at the front end of the receiver and produces an output signal to enable the receiver output stages to transmit recovered data if the incoming signal level indicates the presence of the carrier continuously for at least 40 milliseconds. A noise detector circuit is coupled to the output of the data detector and overrides the carrier level detector circuit whenever the noise level is high enough to indicate that no signal is being received, thereby preventing the receiver from generating false data signals in response to noise.

This invention relates to a circuit for disabling a frequency-shift-keyed data receiver during the absence of carrier signals and, more particularly, relates to a circuit in which the presence of randomly-varying white noise is utilized to disable the receiver to prevent false data from being generated.

In a data receiver of the type in which digital data in binary form is transmitted as a frequency-shift-keyed carrier wave, the receiver is often permanently coupled to the communication medium. The data, however, is not necessarily transmitted continuously so that the receiver, though energized continuously, receives data only intermittently. During intervals when no carrier is being received, the noise level on the communication medium rises. It is necessary, therefore, to ensure that this white noise (i.e., varying randomly across the frequency spectrum and in amplitude) dose not cause the receiver to generate a false data signal.

It is, therefore, a primary objective of the instant invention to provide a network for disabling a frequency-shift carrier data receiver in the absence of a carrier signal to prevent the generation of spurious data signals.

In one form of such a frequency-shift-keyed (F.S.K.) data receiver, the frequency-shift carrier wave bearing the data is received, and the data is recovered in a "zero crossing detector." A detector of this type senses each carrier frequency shift by detecting the number of zero crossings of the carrier per unit time. For example, in one form thereof, a pulse train is generated in response to the zero crossing of the frequency-shift carrier wave, and the duty cycle of this pulse train is varied as carrier frequency shifts back and forth. This pulse train is integrated in a suitable network to produce a DC signal which varies discretely between two levels as the carrier frequency shifts at the data transmission rate. A co-pending application, U.S. Ser. No. 633,205, filed Apr. 24, 1967 entitled "F.S.K. Zero Crossing Detector," filed in the name of Robert P. Dixon, and assigned to the assignee of the instant invention, describes and claims a zero crossing detector of this type. In such a detector, noise fluctuations are also converted to varying DC voltages; but ones which vary over a much wider range than voltages due to carrier frequency shifts. This characteristic may be used to actuate a noise detector which clamps the receiver output to prevent any false or spurious data signals from being generated in the absence of a carrier signal without using special noise filters to distinguish noise from the carrier.

It is, therefore, a further object of the instant invention to provide a circuit for disabling a frequency-shift-keyed data receiver whenever the noise level becomes excessive;

Yet another object of the invention is to provide a disabling circuit for the receiver which is actuated in response to the presence of a noise signal and the absence of a carrier signal in which widely scattered noise bursts or impulses are ineffective to actuate the noise-detector circuitry;

Other objects and advantages of the invention will become apparent as the description thereof proceeds.

The various objects and advantages are realized in a circuit which includes a level detector that senses the presence of the frequency-shift carrier wave and produces an output signal for enabling the receiver if the carrier signal exceeds a predetermined level and persists for at least 40 milliseconds to guard against the possibility of a noise burst at the carrier frequency simulating the appearance of the carrier. A noise detector circuit responsive to the DC output from a zero-crossing F.S.K. detector is utilized to override the level detector and to disable the receiver whenever the output voltage fluctuations from the zero crossing detector exceed the discrete levels which should appear at the output of the detector if only the frequency-shift carrier wave is being received. Thus, the noise detector is actuated in response to a DC output signal from the zero crossing detector and takes advantage of the known characteristics of white noise, i.e., its random variation over a wide frequency band and with large amplitude variation, without use of special noise filters.

The novel features which are believed to be characteristic of this invention are set forth with particularity in the appended claims. The invention, itself, both as to its organization and method of operation, together with further objects and advantages thereof, may best be understood by reference to the following description taken in connection with the accompanying drawings, in which:

Figure 1:
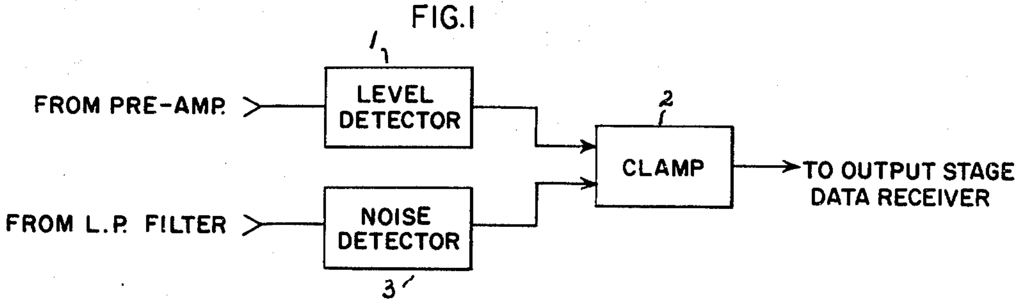
FIGURE 1 is a block diagram showing the clamping circuit.

FIGURE 1 illustrates a circuit, in block diagram form, for disabling the output of a frequency-shift-keyed data receiver which includes a level detector for producing an enabling voltage for a receiver clamping circuit in response to the presence of a carrier of a predetermined level and for a predetermined period of time. A noise detector circuit is also provided and overrides the level detector to disable the clamping circuit and the receiver whenever the DC voltage at the output of the receiver data detector varies over a range of values exceeding those attributable to the frequency shift of the carrier wave. Thus, a level detector channel shown generally at 1 has its input coupled to a stage of the receiver ahead of a data detector of the type disclosed and described in the previously mentioned co-pending patent application. The frequency-shift-carrier wave is rectified in the level detector and produces a unidirectional control signal to actuate a clamp shown generally at 2 whenever the carrier signal is of a predetermined level and persists for at least 40 milliseconds. If the input signal to the detector persists for this period of time, it can be safely assumed that a carrier signal is actually present and that it isn't simply noise falling in the carrier frequency band. Clamping circuit 2 is connected to the data channel of the receiver, to enable the data channel whenever an output signal from the level detector is present indicating that a carrier wave is being received and that data signals are present.

Also coupled to the input of clamp 2 is a noise detector channel shown generally at 3 which is coupled to the output of the zero crossing F.S.K. detector of the receiver and produces an output signal to disable the clamp and the receiver whenever the DC output from the detector exceeds the predetermined range of values. The noise detector circuit is also characterized by the fact that it *will not be actuated* if the voltage exceeds the predetermined levels only occasionally. That is, randomly-occurring and widely spaced noise bursts which may be superimposed on the carrier may produce an input voltage to the noise detector which exceeds the preset level, and this would actuate the noise detector and disable the receiver. However, if these occurrences are sufficienly separated in time, this is a good indication that they are just random noise bursts superimposed on the carrier, and that they do not represent an absence of the carrier. Hence, a timing and pulse-shunting network is included which prevents actuation of the noise detector under these circumstances.

Figure 2:
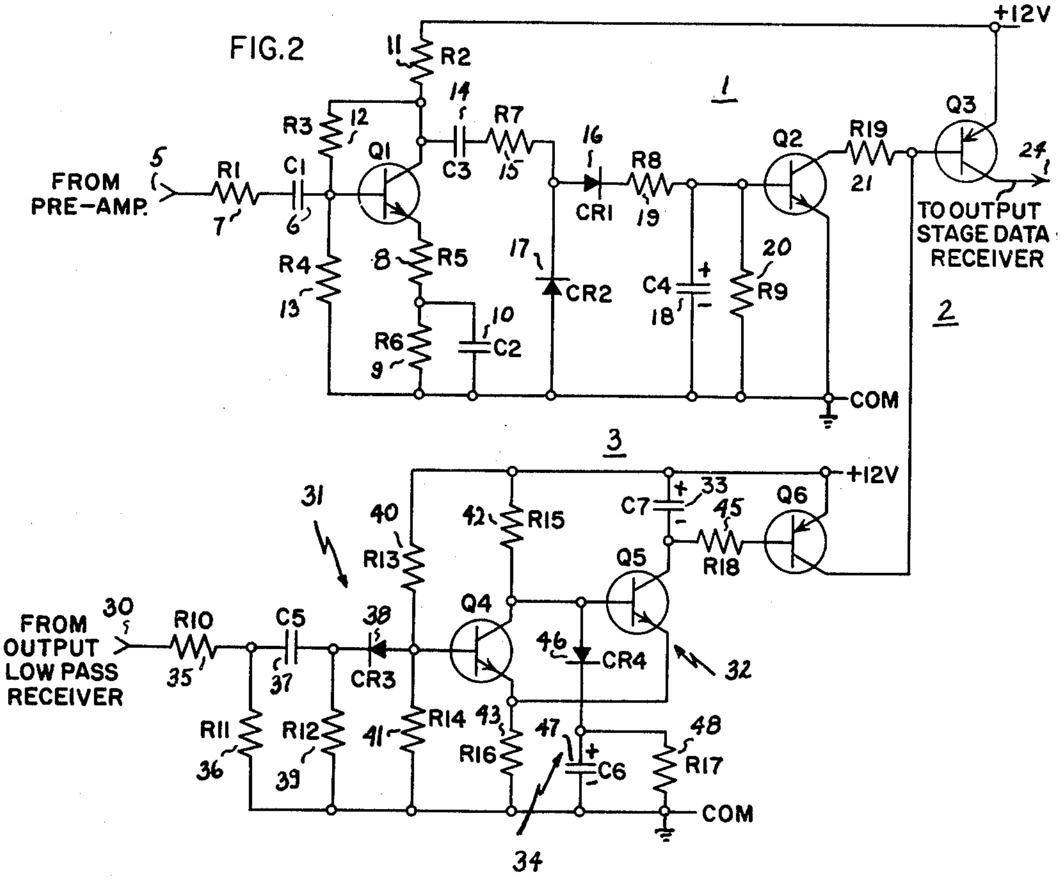
FIGURE 2 is a circuit diagram of the noise clamping circuit.

FIGURE 2 is a schematic circuit diagram of the circuit illustrated in block diagram FIGURE 1. The level detector shown generally at 1 includes an input terminal 5, which is coupled to a stage in the receiver ahead of the detector. The incoming carrier wave, if one is being received, is coupled through resistor 7 and capacitor 6 to the base of NPN transistor amplifier $Q_1$. $Q_1$ has an emitter connected to the ground through a series combination of resistors 8 and 9, the latter of which is bypassed for AC by capacitor 10, and a collector, which is connected to the positive B+ terminal of the supply voltage through a resistor 11. A voltage-divider network consisting or resistors 12 and 13 is connected between the collector of $Q_1$ and ground. The base of the transistor is connected to the junction of the voltage divider which thus establishes the biasing conditions for this transistor. The amplified output signal from $Q_1$ is coupled through capacitor 14 and a resistor 15 to series and shunt diodes 16 and 17 to charge storage capacitor 18. Resistor 15, capacitors 14 and 18, and diodes 16 and 17 form a well known voltage doubler circuit to produce across capacitor 18 a unidirectional voltage, with the polarity shown, which is utilized to control clamp circuit 2 to enable the receiver to transmit the data whenever a carrier wave is bieng received. The voltage doubler is modified by the inclusion of resistor 19 between diode 16 and storage capacitor 18 to form an integrating circuit which introduces a 40-millisecond time delay. That is, the RC time constant of capacitor 18 and resistor 19 is such that the voltage across capacitor 18 reaches the desired level only 40-milliseconds after the appearance of a carrier wave of the proper level. The time-delay is introduced in order to avoid erroneous actuation of the level detector by noise. That is, since noise is random in character, it is possible that certain of the noise frequencies may fall in the frequency band of the carrier signal and, therefore, appear at the input of level detector and tend to charge capacitor 18 through the voltage-doubling arrangement. However, if the input is actually due to noise, it is highly unlikely that noise of the carrier frequency will be present for 40 milliseconds because of the random characteristics of noise. On the other hand, if an input signal at the desired frequency is present for 40 milliseconds or more, this is substantial assurance that the signal represents a transmitted carrier wave, rather than the appearance of random noise in that particular frequency band.

Connected in shunt with capacitor 18 is a discharge resistor 20, which introduces a 15-millisecond delay in the discharge of capacitor 18. This is to ensure that if the carrier wave signal is lost for a short period (i.e., for less than 15 milliseconds, for example) due to some temporary interruption in transmission, the level detector and the clamping circuit are not disabled immediately. The delay permits the circuit to remain energized if the carrier reappears within the given period of time.

The base of an NPN limiter amplifier $Q_2$ is coupled to the doubler and controls clamping transistors $Q_3$ and the output of the receiver. Limiter amplifier $Q_2$ includes an emitter which is connected directly to ground, and a collector which is connected through a resistor 21 to the base of clamping transistor $Q_3$. The collector of limiter-amplifier $Q_2$ is, therefore, connected to the positive B+ terminal of a source of supply voltage through resistor 21, the base-emitter junction of transistor $Q_3$. In the absence of a voltage from the voltage double, the base of transistor $Q_2$ is at ground potential or slightly negative with respect to ground due to base current leakage across resistor 20. The base-emitter junction of $Q_2$ is, therefore, not forward-biased and $Q_2$ does not conduct. The base of $Q_3$ is approximately at the same potential as its emitter, and clamp $Q_3$ is also in the non-conducting state. A positive DC voltage from the voltage doubler makes the base of $Q_2$ more positive than the emitter and $Q_2$ is driven into saturation. The voltage at its collector drops approximately to ground potential since the voltage drop across the emitter-collector path of the transistor is very low in the saturated state. The base of transistor $Q_3$ is now at ground potential, and is negative with respect to its emitter, so that the base emitter junction is now forward-biased, driving transistor $Q_3$ into the conducting state, thereby unclamping the output of the receiver. The collector of $Q_3$ is shown connected to an output terminal 24, which may be connected in any suitable way to the output of the receiver to unclamp the same whenever $Q_3$ is driven into the conducting state by the output of the level detector 1.

The output from noise-detector circuit 3 is also connected to the base of $Q_3$ and applies a positive potential to the base whenever the noise detector is energized, thereby driving $Q_3$ into the non-conducting state, and clamping the output of the receiver to prevent any spurious data signals from being generated.

Noise detector channel 3 includes an input terminal 30, a limiter shown generally at 31 which passes only negative-going DC voltage transitions which exceed a predetermined level, and a switch or trigger circuit 32 for charging a capacitor shown at 33. Capacitor 33, when charged, controls the conductive state of a switching transistor $Q_6$, which is connected to clamping transistor $Q_3$. In addition, switch circuit 32 includes a circuit shown generally at 34, which prevents the switch from being actuated by the first incoming trigger pulse so that the noise detector does not clamp the output of the receiver in response to random, widely-spaced noise pulses.

The input signal to the noise detector, which is impressed on input terminal 30, is taken from the output of the zero crossing detector of the receiver, so that the input signal to the noise detector is a uni-directional voltage which, under normal conditions, varies between two discrete levels representing the two frequencies, $f_1$ and $f_2$ of the frequency-shift carrier waves. The input signal is coupled through a resistive voltage divider consisting of resistors 35 and 36, and a series coupling capacitor 37 to the input of the limiter circuit which consists of diode 38, the cathode of which is connected to coupling capacitor 37 and also connected to ground through resistor 39. The anode of diode 38 is connected to the junction of a voltage divider consisting of series resistors 40 and 41, connected between the positive B+ terminal of a source of supply voltage and ground. The base on NPN transistor $Q_4$ is connected to the junction of resistors 40 and 41. The voltage divider establishes the quiescent-biasing condition for transistor $Q_4$, so that under normal conditions $Q_4$, which forms part of switch 32, is conducting. In addition, it biases diode 38 into conduction. That is, the cathode of diode 38 is connected to ground and its anode is positive with respect to ground by an amount determined by the relative values of resistors 40 and 41. The positive voltage applied to the anode of diode 38 and, hence, the degree of conductivity of the diode, is so adjusted that the anode is more positive than the discrete voltage levels at terminal 30 with the carrier present. If a frequency-shift carrier signal is being received, the voltage at terminal 30 varies from a positive level to a less positive level whenever the frequency of the carrier wave shifts from its higher frequency to its lower frequency, and will change in a more positive direction as the carrier shifts back. The positive-going voltage transition, while reducing the conductivity of diode 38, has no effect on NPN transistor $Q_4$, which is already in the conducting state. The negative-going transition of the input voltage at terminal 30, due to a carrier-frequency shift is not large enough to change the conductivity of diode 38 sufficiently to cut off $Q_4$ and operate switch 32. If there is no carrier, however, and only a noise is received, the unidirectional output from the detector varies over a much wider range of amplitudes, due to the characteristics of noise which varies randomly in frequency and in amplitude. Thus, whenever there is noise present, the DC voltage levels at terminal 30 exceed the normal range of values and the negative excursions of the unidirectional voltage are sufficiently large so that the negative voltage to the base of $Q_4$ drives it into cut-off.

Switch 32 includes two NPN transistors $Q_4$ and $Q_5$. The emitter of $Q_4$ is connected through a resistor 43 to ground. The collector of transistor switch $Q_4$ is connected to the B+ terminal through resistor 42 and directly to the base of $Q_5$. $Q_5$ has an emitter connected to the emitter of transistor $Q_4$ and a collector which is connected through capacitor 33 to the B+ supply voltage terminal. Under normal conditions, $Q_4$ is conducting and the voltage at its collector is substantially the same as that at the emitter. The base and emitter of transistor $Q_5$ are, therefore, also at the same potential, and $Q_5$ is in the non-conducting state. Whenever a negative pulse from limiter 31, indicating the absence of carrier and the presence of noise, drives $Q_4$ into cut-off, the potential at its collector rises towards B+. A positive-going voltage is now applied to the base of $Q_5$ to switch it into conduction. $Q_5$ now provides a charging path for capacitor 33, which charges to the B+ voltage with the polarity shown.

Whenever capacitor 33 is charged, switching transistor $Q_6$ is driven into the conducting state and applies the positive voltage from the B+ terminal to the base of transistor $Q_3$, clamping the output of the receiver to prevent transmission of data signals. Transistor $Q_6$ is a PNP transistor having an emitter connected directly to the B+ terminal, a collector connected to the base of $Q_3$, and through the base-emitter junction of $Q_3$ to the B+ terminal. The base of transistor $Q_6$ is connected through resistor 45 to the junction of the collector of $Q_5$ and capacitor 33. Thus, whenever capacitor 33 charges up with the polarity shown, the base of PNP transistor $Q_6$ becomes more negative than its emitter, forwardbiasing that junction and driving $Q_6$ into saturation. With $Q_6$ in saturation, the voltage drop across its collector-emitter path is very low, thereby clamping the base of $Q_3$ substantially to the voltage at the B+ terminal. Since $Q_3$ is a PNP transistor, the positive voltage drives $Q_3$ into cut-off, thereby disabling the receiver. It can be seen that the noise detector shown generally at 3 overrides the effect of the level detector to control the conductivity of clamping transistor $Q_3$ and the output of the receiver whenever the unidirectional input at terminal 30 exceeds a predetermined range representative of the frequency shift of the carrier wave.

In order to prevent the noise detector from being actuated and clamping the output of the receiver due to randomly spaced noise bursts which may be present along with the carrier signal, switch 32 of the noise detector includes a circuit 34 which prevents the first triggering pulse applied to the switch from actuating transistor $Q_5$ and switching transistor $Q_6$. To this end, a shunt path to ground is provided at the output of $Q_4$ which includes a diode 46 connected in series with parallel combination of capacitor 47 and resistor 48. Capacitor 47 and diode 46 are connected between the collector of $Q_4$ and ground, and operate to bypass the first switching pulse from the input of transistor $Q_5$. That is, the appearance of the first negative pulse which passes through limiter 31 drives transistor $Q_4$ into the non-conducting state, so that the voltage at its collector rises approximately from ground potential to the potential at the B+ terminal of the supply voltage. The positive-going transition drives diode 46 into conduction, since its cathode is connected to ground through resistor 48 and its anode is now at the B+ potential. When diode 46 conducts, capacitor 47 charges to the B+ voltage with the polarity shown. The first positive-going transition, therefore, has no effect on transistor $Q_5$, since it is shunted to ground by the diode 46 and transistor $Q_5$ remains in the non-conducting state. The time constant of capacitor 47 and resistor 48 establishes the minimum interval required between triggering pulses, to actuate the noise detector. That is, if the next negative pulse from limiter 31 occurs before capacitor 47 has discharged, the cathode of diode 46 is still positive enough to reverse-bias the diode so that the next positive transition at the collector of $Q_4$ cannot drive diode 46 into conduction. The positive voltage is, therefore, applied to the base of $Q_5$, driving it into conduction and charging capacitor 33. If, however, the interval between the succeeding negative pulses exceeds a predetermined time as established by the R-C time constant of capacitor 47 and resistor 48, indicating that the noise pulses are widely spaced and represent not the absence of carrier, but simply random noise bursts superimposed on the carrier, capacitor 47 has discharged sufficiently through resistor 48 so that the cathode of diode 46 is again substantially at ground potential, and the next negative pulse which drives the collector of $Q_4$ to ground to prevent $Q_5$ from being driven into conduction.

If the pulses are sufficiently close together, the network consisting of diode 46, capacitor 47 and resistor 48 is disabled after the appearance of the first pulse and all succeeding negative triggering pulses switch $Q_4$ into the non-conducting state and $Q_5$ into the conducting state, thereby charging capacitor 33 and maintaining it at the level required to drive switching transistor $Q_6$ into conduction and to maintain it there. This, in turn, clamps clamping transistor $Q_3$ into the non-conducting state, preventing any data output therefrom which represents spurious data characteristics due to noise, rather than actual data abstracted from the modulated frequency-shifted carrier wave.

A circuit such as the one illustrated in FIGURE 2 and described above was constructed for a frequency-shift-keyed data receiver in which the frequency of the carrier wave was shifted between 1200 and 2200 hertz at a rate of 1800 bits (or bauds) per second. The circuit was constructed of components having the following values:

| | |
|---|---|
| $Q_1$, $Q_2$, $Q_4$, $Q_5$ | Silicon NPN transistors, type 2N2712. |
| $Q_3$, $Q_6$ | Silicon PNP transistors, type 2N3702. |
| $R_1$ | 6,800 ohms. |
| $R_2$ | 10,000 ohms. |
| $R_3$ | 22,000 ohms. |
| $R_4$ | 100,000 ohms. |
| $R_5$ | 200 ohms. |
| $R_6$ | 18,000 ohms. |
| $R_7$ | 1,000 ohms. |
| $R_8$ | 11,000 ohms. |
| $R_9$ | 51,000 ohms. |
| $R_{10}$ | 20,000 ohms. |
| $R_{11}$ | 47,000 ohms. |
| $R_{12}$ | 100,000 ohms. |
| $R_{13}$ | 160,000 ohms. |
| $R_{14}$ | 20,000 ohms. |
| $R_{15}$ | 100,000 ohms. |
| $R_{16}$ | 1,000 ohms. |
| $R_{17}$ | 300,000 ohms. |
| $R_{18}$ | 33,000 ohms. |
| $R_{19}$ | 27,000 ohms. |
| $C_1$ | 0.1 microfarad. |
| $C_2$ | 3.3 microfarads. |
| $C_3$ | 0.22 microfarad. |
| $C_4$ | 3.3 microfarads. |
| $C_5$ | 0.1 microfarad. |
| $C_6$ | 2.2 microfarads. |
| $C_7$ | 1.0 microfarad. |
| $CR_1$, $CR_2$, $CR_3$, $CR_4$ | Silicon diodes. |

It will now be apparent that a circuit has been described which is useful in a frequency-shift-keyed data receiver to protect against erroneous or spurious outputs from the receiver due to noise conditions when no frequency-shift-keyed carrier is being received, so that the receiver may be continuously energized and attached to the line to await the receipt of intermittently transmitted data. It will further be appreciated by those skilled in the art that the circuit is simple in operation and not only protects the receiver against spurious response due to noise, but also ensures that the receiver is not inadvertently clamped or unclamped due to a short-term loss of carrier or due to widely dispersed and random noise bursts which may occur even in the presence of a carrier signal.

While a particular embodiment of this invention has been shown, it will, of course, be understood that the invention is not limited thereto, since many modifications, both in the circuit arrangement and in the instrumentalities employed, may be made.

What is claimed as new and desired to be secured by U.S. Letters Patent is:

1. A noise-clamping circuit for a frequency-shift-keyed receiver having a first point at which a received carrier signal can be derived, a second point at which a detected signal can be derived, and a third point for controlling the output of the receiver, said noise-clamping circuit comprising:

(a) a carrier-level detecting circuit connected to said first point for producing an enabling signal at its output after a selected time interval following receipt of a carrier signal;

(b) a clamping circuit having an input connected to said carrier-level detecting circuit output and an output adapted to be connected to said third point for unclamping said frequency-shift-keyed receiver in response to said enabling signal;

(c) a noise-detecting circuit adapted to be connected to said second point for producing a disabling signal after a selected time interval following receipt of a detected signal whose amplitude exceeds a selected magnitude;

(d) and means connecting said noise-detecting circuit to said clamping circuit for causing said clamping circuit to clamp said frequency-shift-keyed receiver in response to said disabling signal, even during the time an enabling signal is supplied to said clamping circuit.

2. The noise-clamping circuit of claim 1 wherein said noise-detecting circuit produces said disabling signal only after receipt of a detected signal having a duration in excess of a selected time period.

3. The noise-clamping circuit of claim 1 wherein said carrier-level detecting circuit continues to produce said enabling signal for a selected time interval following removal of said carrier signal.

4. The noise-clamping circuit of claim 3 wherein said noise-detecting circuit produces said disabling signal only after receipt of a detected signal having a duration in excess of a selected time period.

References Cited

UNITED STATES PATENTS

| | | | |
|---|---|---|---|
| 3,155,910 | 11/1964 | Mann et al. | 325—348 |
| 3,353,102 | 11/1967 | Meyers et al. | 325—30 |

ROBERT L. GRIFFIN, Primary Examiner

J. A. BRODSKY, Assistant Examiner

U.S. Cl. X.R.

178—88; 325—348, 473, 478, 480

PO-1050
(5/69)

UNITED STATES PATENT OFFICE
CERTIFICATE OF CORRECTION

Patent No. 3,497,812 Dated February 24, 1970

Inventor(s) Robert P. Dixon

It is certified that error appears in the above-identified patent and that said Letters Patent are hereby corrected as shown below:

In the specification, please make the following changes:

Column 3, line 33 - Change "sufficienly" to -- sufficiently -- .

line 50 - Change "or" to -- of -- .

Column 4, line 29 - Change "double" to -- doubler -- .

Column 5, line 42 - After "voltage" insert -- applied -- .

Column 8, line 18 - Delete "adapted to be" .

SIGNED AND
SEALED
NOV 24 1970

(SEAL)
Attest:

Edward M. Fletcher, Jr.
Attesting Officer

WILLIAM E. SCHUYLER, JR.
Commissioner of Patents